United States Patent [19]
Bonissone et al.

[11] Patent Number: 5,806,052
[45] Date of Patent: Sep. 8, 1998

[54] FUZZY HIERARCHICAL CONTROLLER FOR A TURBOSHAFT ENGINE

[75] Inventors: Piero Patrone Bonissone; Kenneth Hsin-Chao Chiang; Mark Edward Dausch; James Baldwin Comly, all of Schenectady, N.Y.

[73] Assignee: General Electric Company, Schenectady, N.Y.

[21] Appl. No.: 192,939

[22] Filed: Feb. 7, 1994

Related U.S. Application Data

[63] Continuation of Ser. No. 909,290, Jul. 6, 1992, abandoned.

[51] Int. Cl.$^6$ ..................................................... G06F 15/18
[52] U.S. Cl. ............................ 706/4; 706/1; 706/3; 706/8
[58] Field of Search ................................ 395/11, 61, 900, 395/3, 903–904, 907; 364/132, 131, 138, 414.1, 431.05; 706/1–9

[56] References Cited

U.S. PATENT DOCUMENTS

| | | | |
|---|---|---|---|
| 4,985,824 | 1/1991 | Husseiny et al. | 395/11 |
| 5,012,430 | 4/1991 | Sakurai | 395/11 |
| 5,095,417 | 3/1992 | Hagiware et al. | 364/138 |
| 5,161,110 | 11/1992 | Dorchak | 395/61 |
| 5,170,357 | 12/1992 | Sasaki et al. | 395/900 |
| 5,204,935 | 4/1993 | Mihara et al. | 395/61 |
| 5,213,077 | 5/1993 | Nishizawa et al. | 395/900 |
| 5,229,946 | 7/1993 | Ghaem | 364/431.05 |
| 5,249,258 | 9/1993 | Hisano | 395/3 |
| 5,390,117 | 2/1995 | Graf et al. | 364/424.1 |

OTHER PUBLICATIONS

Michio Sugeno, Toshiaki Murofushi, Junji Nishino, and Hideaki Miwa. "Helicopter Flight Control Based on Fuzzy Logic." Fuzzy Engineering toward Human Friendly Systems: Proceedings of the International Fuzzy Engineering Symposium '91, Nov. 13th–15th, 1991, vol. 2, pp. 1120–1121.

P.J. Mac Vicar–Whelan, "Fuzzy Sets for Man–Machine Interaction," International Journal of Man–Machine Studies, vol. 8, pp. 687–697, Nov. 1976.

(List continued on next page.)

*Primary Examiner*—Tariq R. Hafiz
*Attorney, Agent, or Firm*—David C. Goldman; Marvin Snyder

[57] ABSTRACT

A fuzzy logic supervisory control architecture for aircraft engines includes a series of fuzzy proportional integral controllers each designed for a specific operating range and a fuzzy logic hierarchical controller for combining the fuel flow derivative outputs of the individual controllers. The hierarchical controller utilizes fuzzy logic on the input space fuzzified to linguistic values for engine temperature, power turbine speed and spool acceleration to determine a weighting to be given to each of the controller outputs for fuel flow derivative.

9 Claims, 7 Drawing Sheets

OTHER PUBLICATIONS

Raju et al, "Adaptive hierarchical fuzzy controller"; IEEE Transactions on Systems, Man and Cybernetics, vol. 23 iss. 4 pp. 973–980, Jul.–Aug. 1993.

Rueda et al, "Adesign method for a class of fuzzy hierarchical controllers"; Second IEEE International Conference on Fuzzy Systems, pp. 196–199 vol. 1, 28 Mar.–1 Apr. 1993.

Isik, C.J. Metstel, A.M.; "Pilot Level of a Hierarchical Controller for an Unmanned Mobile Robot"; IEEE Journal of Robotics & Automation; vol. 4, No. 3, Jun. 1988.

Wantanabe, H.; Dettloff, W.D.; Yount, K.E.; "AVLSI Fuzzy Logic Controller with Reconfigurable, Cascadable Architecture"; IEEE Journal of Solid State Circuits; vol. 25 No. 2 Apr. 1990.

Raju, G.V.S.; Zhou, J.; "Fuxxy Logic Process Controller"; IEEE International Conference of Systems Engineering; 9–11 Aug. 1990.

Kang, H.; Vachstsevanos, G.; "An Intelligent Strategy to Robot Coordination and control"; Procedings of the 29th IEEE Conference on Decision and Control; 5–7 Dec. 1990.

Garcia–Benitez, E.; Yurkowich,S.; Passiono, Kim.; "A Fuzzy Supervisor for Flexible Manipulator Control"; Proceedings of the 1991 IEEE International Symposium on Intelligent Controller; 12–15 Aug. 1991.

Stover, J.A.; Gibson, R.E.; "Continuos Inference Networks for Autonomous Systems"; IEEE Conference on Neurol Networks for Ocean Engineering; 15–17 Aug. 1991.

Yurkovich, S.; Passino, K.M.; Garcia–Benitez, E.; "Rule––Based Tuning for Control of Flexible–Link Manipulators"; Proceedings of the 30th IEEE Conference on Decision and Control. 11–13 Dec. 1991.

Tseng, H.C.; Hwang, V.; Lui, S.L.; "Fuzzy Servocontroller: The Hierarchical Approach"; IEEE International Conference on Fuzzy Systems; 8–12 Mar. 1992.

IF E IS NM AND dE/dt IS NL THEN dU IS PH fig. 7a     fig. 7b fig. 7c     fig. 7d

FUZZY HIERARCHICAL CONTROLLER FOR A TURBOSHAFT ENGINE

This application is a Continuation of application Ser. No. 07/909,290, filed Jul. 6, 1992, now abandoned.

BACKGROUND OF THE INVENTION

Figure 1:
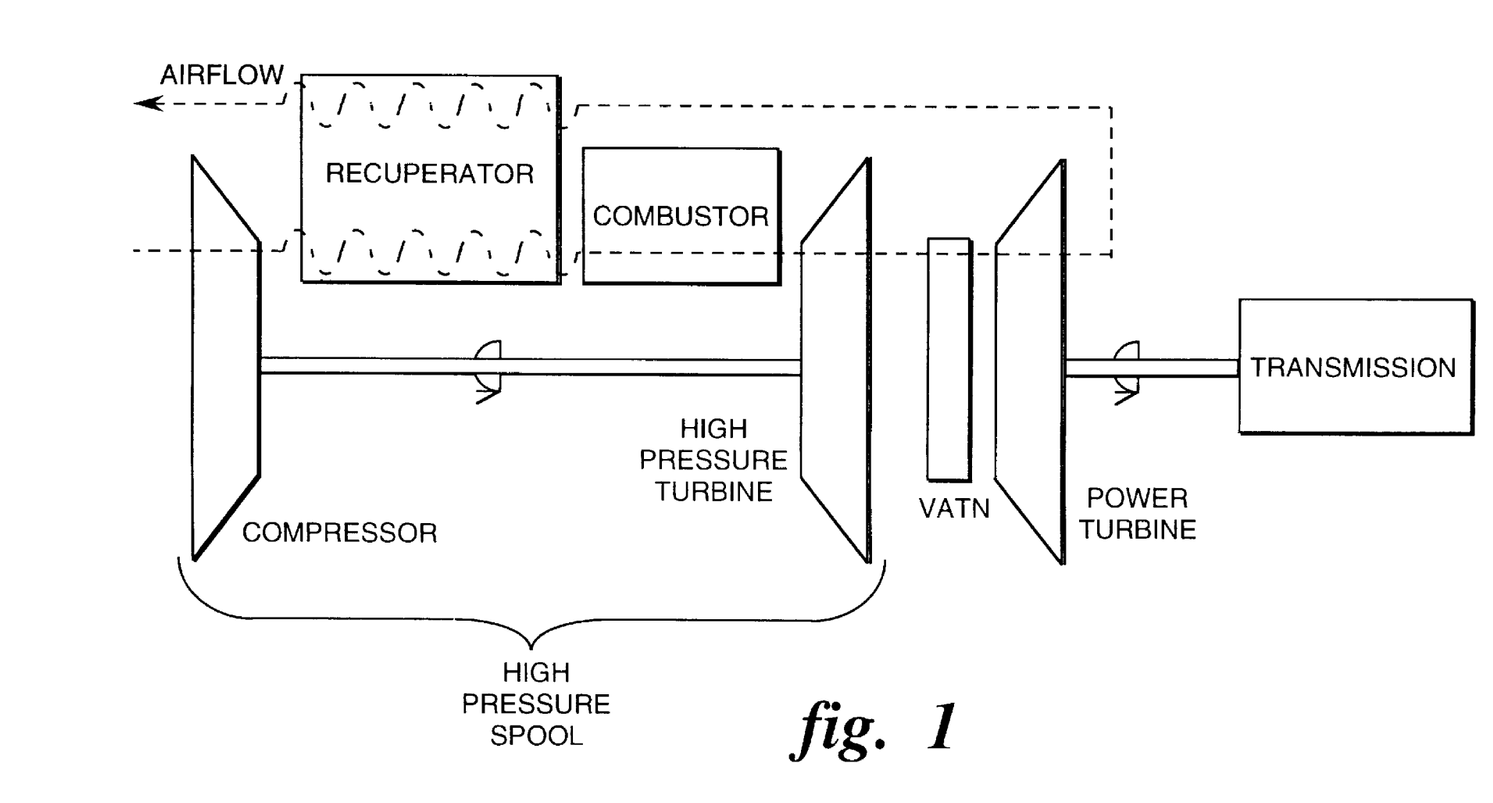
FIG. 1 (prior art) is a schematic diagram of a turboshaft engine.

The present invention is related to fuzzy-logic control in general and more specifically to fuzzy-logic controllers for turboshaft engines such as those used to power armored vehicles and aircraft. A typical turboshaft engine is shown in prior art FIG. 1. The operation of a gas turbine is based upon the Brayton cycle, in which intake, compression, combustion, expansion and exhaust all take place simultaneously. As can be seen in FIG. 1, after entering the engine through an intake, air passes through a compressor, which increases the pressure of incoming air from the ambient to a maximum value. Next, the compressed flow is warmed in the recuperator by the exhaust air. Fuel is injected into the combustor and ignited, providing the flow with additional heat energy. A high pressure turbine extracts pressure and heat energy from the flow and converts it to rotational energy, which is transmitted down a common shaft to the compressor. Together the assembly of compressor, shaft, and high pressure turbine is termed the high pressure spool, or spool.

Upon exiting the high pressure spool, the flow passes through the variable area turbine nozzle (VATN), a set of vanes that control air flow by the degree to which they are angled in relation to the flow. The free power turbine further extracts pressure and heat energy from the flow and converts it to rotational energy that is transmitted down a shaft to the transmission. The flow is then forced through the recuperator again, and finally released through the exhaust.

There are three major goals in the control of the turboshaft engine. The first is to respond to requests from the operator, who indicates a desired power by a throttle setting, also referred to as the power lever angle (PLA). The second goal is to operate the engine as efficiently as possible for optimum fuel consumption. The third goal is to protect the engine against overtemperature and undue mechanical stress.

The two variables which are used to realize the power request from an operator are fuel flow and VATN angle. The obvious correlation exists between fuel flow and power—if an increase in power is desired, the fuel flow must be increased. If the increase is too great however, one or more problems may occur. First, the compressor may stall. Various engine components downstream of the combustor may suffer stress from the high temperature or high change in temperature. Finally, the high pressure spool or the power turbine may overspeed. If a decrease in fuel flow is too great, one or more other problems may occur. First, the engine may flare out. Minimum airflow may not be supported. Finally, no power may be generated for accessories. Control of the fuel flow may be thought of as a coarse adjustment to engine operation, whereas fine tuning is achieved by controlling VATN angle. When the VATN is fully open, the airflow is not obstructed. Closing it decreases the flow, increasing temperatures and pressures throughout the engine, as well as overall cycle efficiency. Hence, high temperatures and pressures are encouraged, but excessively high values for these quantities may have the same detrimental effects noted above. In addition, closing the VATN speeds up the power turbine, but this has a less pronounced effect than that of increasing fuel flow.

Figure 2:
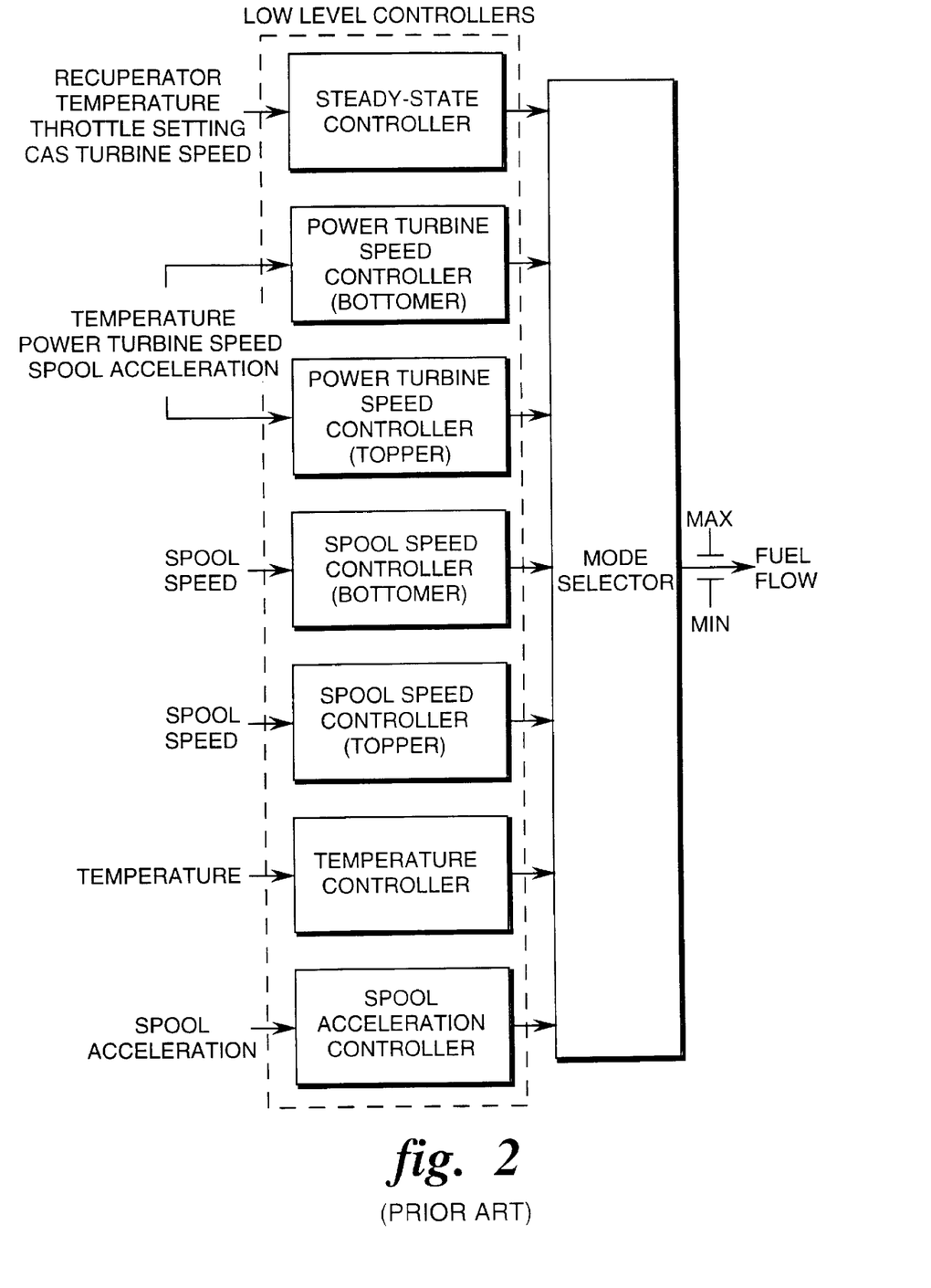
FIG. 2 (prior art) is a schematic diagram of a conventional turboshaft engine control system using min/max mode selection.

In prior art FIG. 2, a typical control scheme for a turboshaft engine uses a series (as many as ten or more) of low level controllers designed to govern the engine when specific conditions or modes are sensed. These low level controllers examine various sensor readings from points within the engine and produce fuel flow and VATN angle derivatives, also known as wfdots and vtdots, respectively. These rates then drop through a chain of minimums and maximums (min/max ladder) that selects one of those rates. Finally, the selected rates pass through integrators equipped with limiters and then on to actuators.

Each low level controller is designed for a specific function. For example, one of the controllers may hold the acceleration of the high pressure spool to a reference value while another controller may hold the engine temperature below a certain level. The exact types and functions of the controllers may vary and can be uniquely designed for specific types of engines.

Figure 3A:
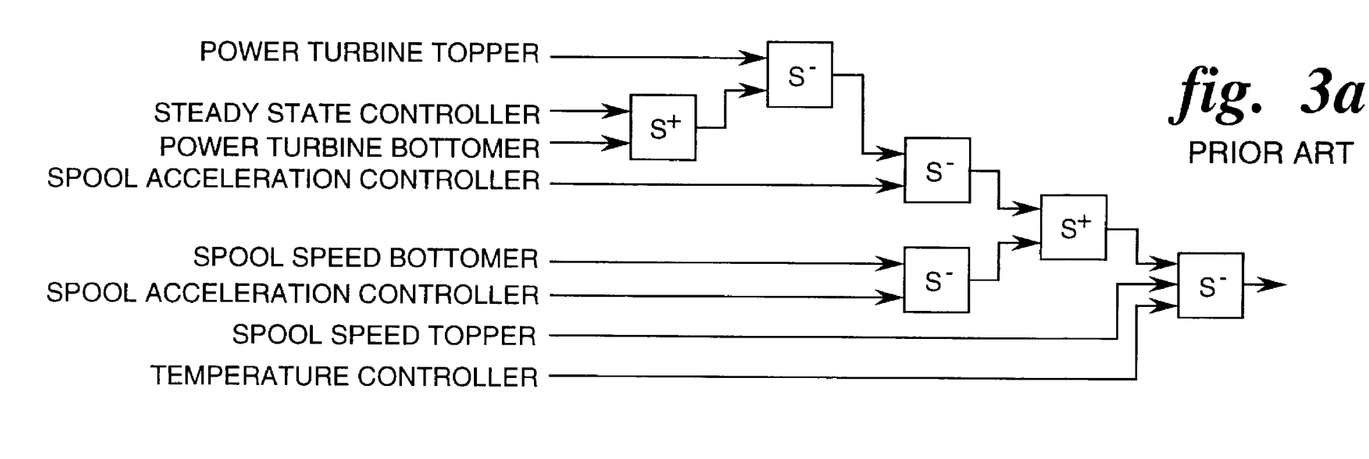
FIG. 3a (prior art) is a depiction of the operation of a min/max ladder.
Figure 3B:
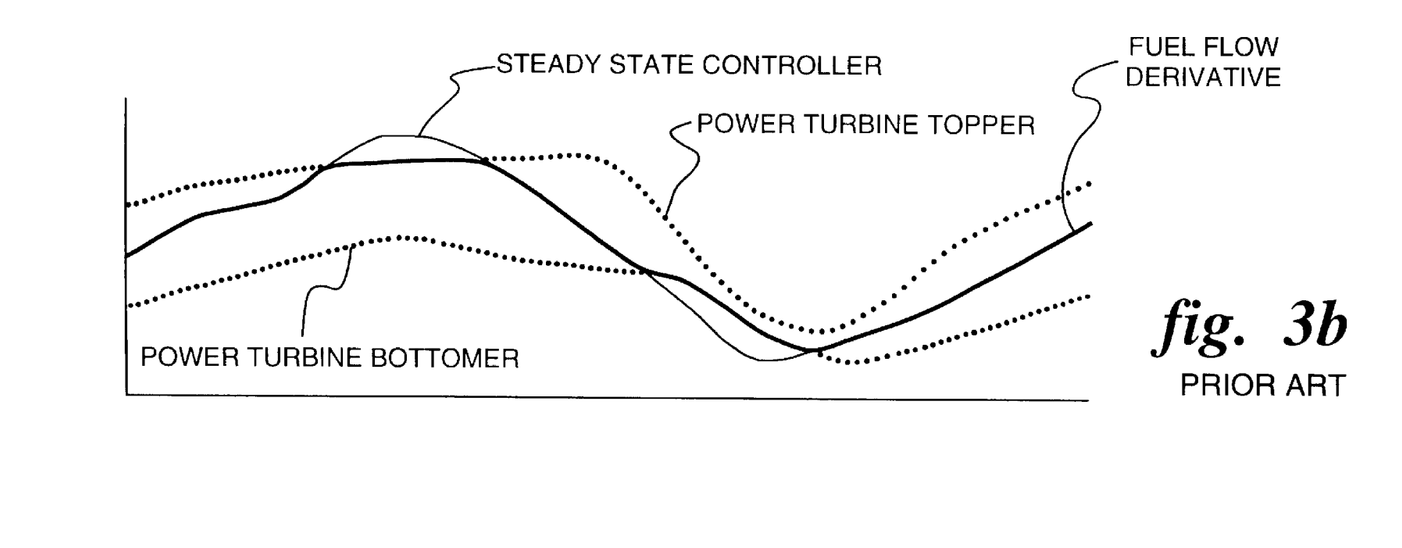

Prior art FIG. 3a shows the functioning of the min/max ladder described above. The s+ boxes indicate a maximum operator and the s− boxes indicate a minimum operator. As an example, controller A provides a minimum rate and controller B a maximum rate (A and B might be responsible for maintaining a minimum and maximum power turbine speed respectively). If the rate of controller C is less than that of controller A, then the rate of controller A is chosen; if greater than that of controller B, then the rate of controller B is chosen. This action is shown in FIG. 3b. It can be observed from FIG. 3b that the effect of having only one controller active at any point in time corresponds to clipping the fuel flow derivative. This clipping effect, caused by the abrupt mode selection, can produce less than optimal performance. The min/max ladder actually only operates on fuel flow derivative. The VATN angle derivative is determined based on the fuel flow selected.

SUMMARY OF THE INVENTION

The present invention is a fuzzy logic based controller for a turboshaft engine. The control system has two levels of control. A set of low level controllers examine various sensor readings from points within the engine and produce fuel flow and VATN angle derivatives. These controllers can be of the proportional-integral (PI) type or can be fuzzy PI controllers. A fuzzy hierarchical controller blends the outputs of the low level controllers to produce a single output for controlling the engine. The particular weights given to the output of each low level controller depends on the mode of engine operation. Three key engine parameters are used to define the possible modes of engine operation. Fuzzy sets are then defined for these three engine signals. The fuzzified values of these signals act as input to the fuzzy inference engine which computes a single output based on the firing of one or more rules in the rule base.

The use of a fuzzy logic based hierarchical controller provides a number of advantages over prior art controllers for turboshaft engines which do not employ fuzzy logic. The response of the engine is improved. When switching between two or more modes, the inferencing method of fuzzy logic interpolates between the control actions for those modes resulting in smoother mode transitions. Fuel consumption is lowered due to more efficient setting of the engine, determined by the combination of fuel requirement and VATN angle. The fuzzy logic approach of the present invention allows the designer to directly represent the knowledge about the regions of applicability of the low level controllers in the knowledge base of the fuzzy hierarchical controller. This separation simplifies and shortens the design cycle of the low level controllers, which are designed to handle the dynamics, while the fuzzy hierarchical controller is designed to deal with quasi steady-state conditions.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 3b (prior art) is a graph of fuel flow derivative as selected by the min/max ladder of FIG. 3a.

FIGS. 7c and 7d are the control matrices for the power turbine topper and bottomer respectively.

DETAILED DESCRIPTION OF THE INVENTION

The deficiencies attendant with the use of a min/max ladder supervisory control strategy as described in the background section herein, are avoided in the present invention by the use of a fuzzy-logic based hierarchical controller which improves both engine performance and fuel consumption. This fuzzy-logic based hierarchical controller, instead of choosing only one control mode at any given iteration of the control loop, blends the outputs of the low level controllers by using a weighted sum of the outputs. As a result, instead of having the fuel flow derivative hit the boundaries of the envelope and be clipped, the flow derivative is steered away from the boundaries. Instead of choosing a single dominant mode based on controller rates, the selection is accomplished by examining specific engine sensor values, or parameters. The low level controllers do not have to be modified in any way.

The use of fuzzy logic in a closed loop control system is well known in the art. Background information on fuzzy logic and fuzzy logic control is provided in commonly assigned co-pending patent application Ser. No. 07/775,873 which is incorporated herein by reference.

Although many engine parameters may be chosen to define the modes of engine operation, the inventors have found that the recuperator inlet temperature, power turbine speed, and spool acceleration were key in one embodiment of the invention.

Figure 4:
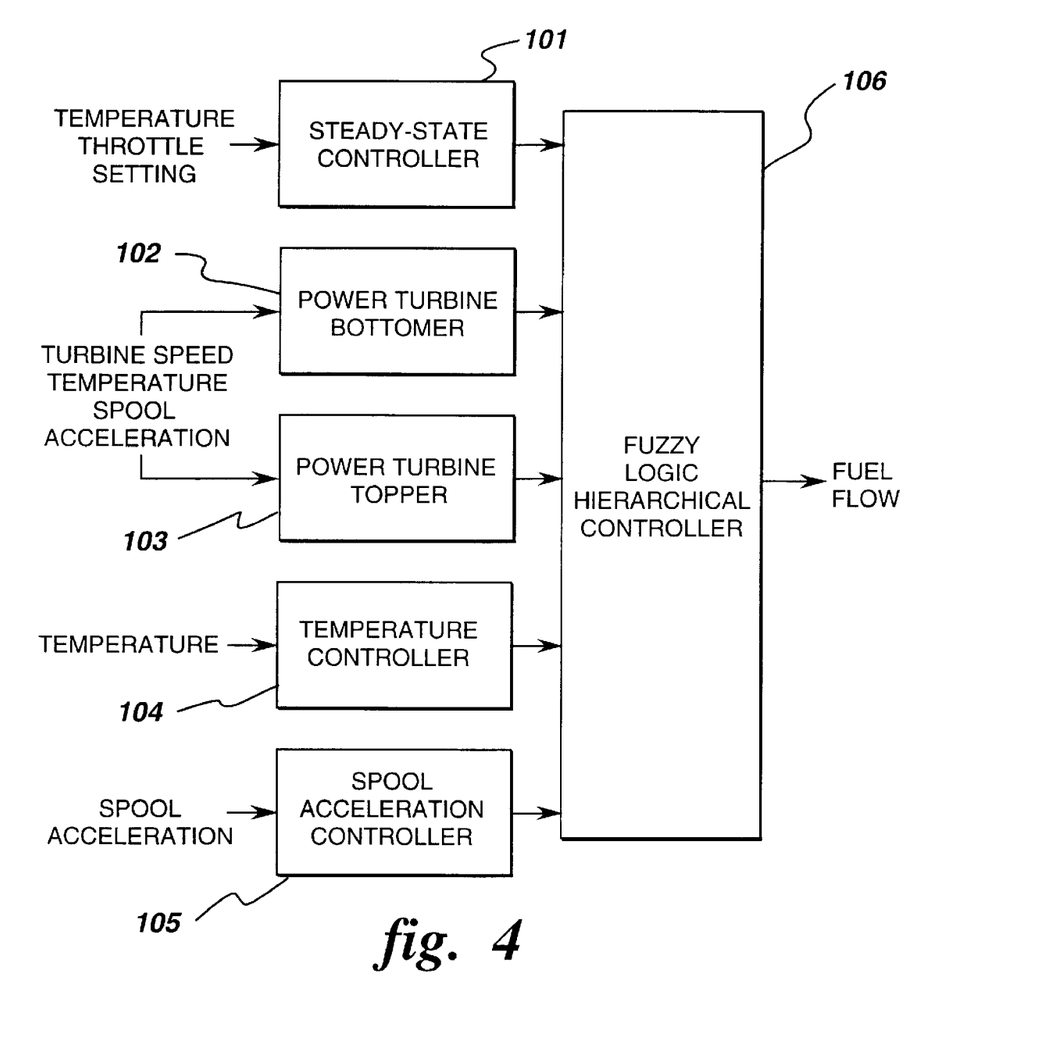
FIG. 4 is a schematic diagram of the fuzzy logic hierarchical control system of the present invention.

FIG. 4 shows the present invention in block diagram form. In this implementation, five low level controllers 101–105 are active. Controllers 101–105 take as input the three engine signals selected to define engine modes of operation. The throttle setting is used as a reference for spool speed in the steady-state controller 101. Steady-state controller 101 is designed to control the engine under normal operating conditions, responding to the driver's commands while maintaining recuperator temperature at an optimal value. Throttle setting is used as the reference for spool speed and a precomputed recuperator temperature, scheduled as a function of corrected spool and power turbine speeds, is used as the temperature reference. Power turbine bottomer 102 and topper 103 keep the power turbine speed in its normal range of operation while maintaining temperature at an optimum value. Temperature limiter controller 104 holds engine temperature below the minimum of three limits—the combustor outlet limit, the high pressure turbine outlet limit, and the recuperator outlet limit itself. During transients, spool acceleration controller 105 holds the acceleration of the spool, or high pressure spool, to a reference value, to avoid stall and mechanical constraints. The reference value is the minimum of three values—the maximum acceleration permissible based on compressor stall margin and the maximum accelerations based on high pressure turbine inlet and outlet temperatures. Reference fuzzy sets are defined for the three mode defining engine signals and stored in the memory portion of fuzzy logic hierarchical controller 106. As an example, recuperator inlet temperature can be divided into two regions assigned the linguistic labels normal and high; power turbine speed into three regions: low, normal, and high; and spool acceleration into four regions: positive high, positive low, zero, and negative. In this way, twenty-four modes of engine operation are identified. Fuzzy logic hierarchical controller 106 computes a control action which is a weighted sum of the controller outputs. The actual operation of fuzzy logic hierarchical controller 106 is somewhat similar to a standard fuzzy logic controller such as described in patent application Ser. No. 07/775,873. FIGS. 5 through 7, therein, depict graphically a fuzzy logic inferencing process using two rules.

In the example described above, there are twenty-four rules, each one corresponding to a particular combination of fuzzified values of the input variables (e.g., temperature=normal, acceleration=low, turbine speed=neg). Each rule has associated with it a set of controller weights. Table 1 below shows one example of controller weights for each of the twenty-four possible engine modes. These weights correspond to the output or consequent of the fuzzy rules. There are no fuzzy sets for the output, in contrast with the fuzzy reasoning process shown in FIGS. 5–7 of patent application Ser. No. 07/775,873. If a given rule fires, a weighted average of the low level controller fuel flow derivatives is computed. If two or more rules fire (as is possible due to overlapping termsets on the input space), indicating that the engine is presently operating in two or more modes, multiple weighted averages are computed in a like manner for each rule. A final weighted average is then computed for the resulting average derivatives using the degree of rule applicability (denoted by $\lambda$ in patent application Ser. No. 07/775,873), for each rule fired, as the weights. This approach is equivalent to the height method of output defuzzification (as described in the aforementioned patent application), if fuzzy sets having centers of mass equal to the values listed in Table 1 had been defined for the controller weights. The implementation of the present invention, however, is computationally less expensive than storing a number of linguistic sets and tuning the rules becomes easier.

It will be understood by those skilled in the art that the present invention is not limited by any particular set of rules or fuzzy set definitions. Although the rules should generally be aimed at preventing extreme modes (e.g., over or underspeeding) of operation, it is possible to add rules which will override those aimed at component safety for emergency situations and in those situations where complete shutdown is desirable.

Further improvement in performance is achieved by replacing the conventional low level controllers with fuzzy logic proportional-integral (PI) controllers. A conventional PI controller is described by the function $$u = K_p e + K_i \int e \, dt$$
$$= \int (K_{\dot{p}} \dot{e} + K_i e) dt$$
$$du = (K_{\dot{p}} \dot{e} + K_i e) dt$$

Figure 6A:
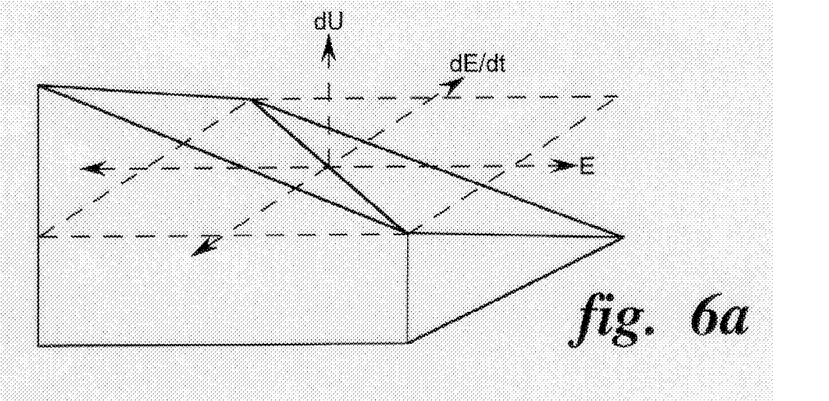
FIG. 6a is a diagram of the control surface for a conventional PI controller.

The proportional term provides control action equal to some multiple of the error, while the integral term forces the steady state error to zero. Otherwise, the controller will always force a change in the manipulated value.

e is defined as the set point subtracted from the actual value of a given signal, and ė denotes an increasing rate of change of e. A particular control law might require a high positive du to counter a high negative e with a high negative ė and a high negative du to counter a high positive e and ė. The goal of a control law is to bring the system to the equilibrium point of zero e and zero ė. In a three dimensional space with axes e, ė, and du, the control surface du of a conventional PI would be a plane passing through the origin and oriented at some angle with respect to the e-ė plane, the angle determined by the particular values of $K_p$ and $K_i$ as shown in FIG. 6a. Once initial values of $K_p$ and $K_i$ have been determined by the Zeigler-Nichols method, a number of heuristics can be used to fine tune those values. Increasing $K_p$ causes the rise time to decrease, because the error will be amplified and the controller will output a greater controller action. Unfortunately, the controlled variable will overshoot its steady-state value, and the oscillation about that value will be markedly greater, for the same reason. Decreasing $K_i$ will also reduce the overshoot of the controlled variable, but at the expense of the rise time, because the integral of the error will be attenuated.

Figure 6B:
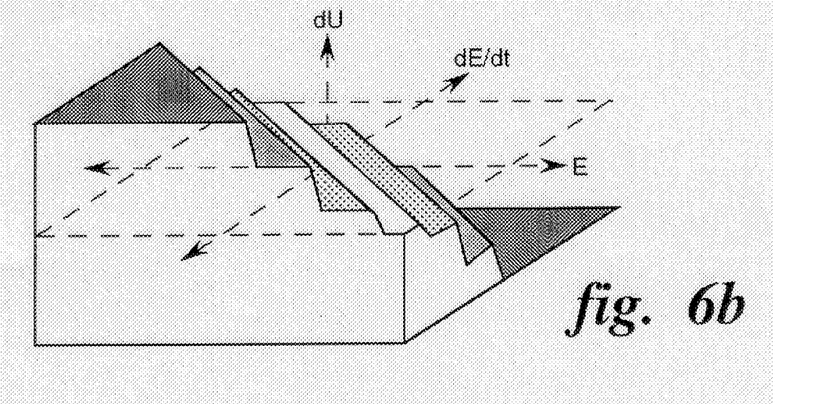
FIG. 6b is a diagram of the control surface for a fuzzy logic PI controller.
Figure 6C:
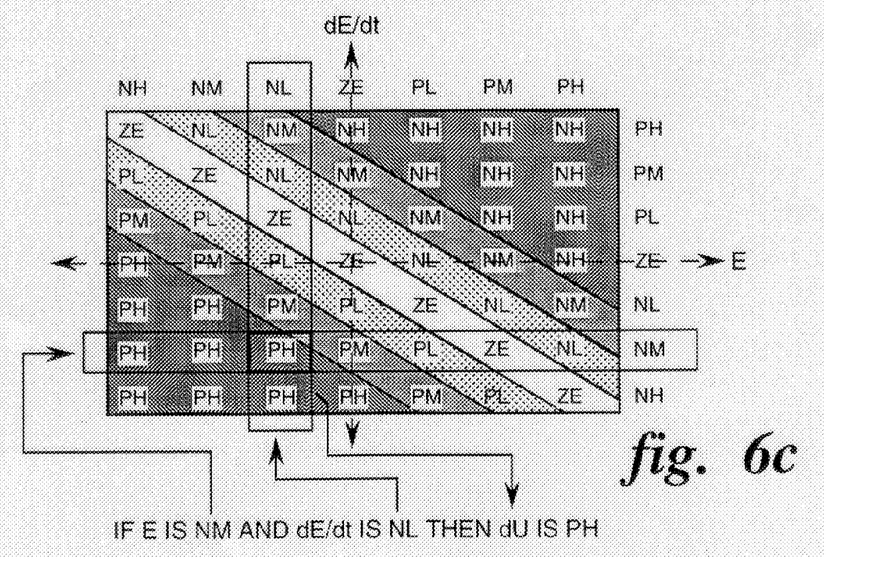
FIG. 6c is the control matrix for the fuzzy logic controller derived from FIG. 6b.

Using fuzzy logic, a step-like control surface with gradations between the steps can be synthesized to approximate the control surface of the conventional PI, as can be seen in FIG. 6b. Reference fuzzy sets must be defined for e, ė, and du. In a collection of rules termed a control matrix, a distribution for the controller output du is defined for each combination of linguistic sets for e and ė. In FIG. 6c, e has been divided into seven fuzzy sets; PH (positive high), PM (positive medium), PL (positive low), ZE (zero), NL (negative low), NM (negative medium) and NH (negative high). ė has also been divided into reference fuzzy sets with the same linguistic labels, but it is important to note that e and ė are not defined over the same universe of discourse, so that the membership functions for the reference fuzzy sets are not necessarily identical.

If the membership functions for e and ė are properly defined so that they overlap by a certain percentage (a good rule of thumb is 25%), and if either of or both e and ė happen to fall into the overlapping area, two or more rules will fire resulting in an interpolation of the du values for each rule.

The control matrix and the reference fuzzy sets constitute the contents of the knowledge base for the fuzzy PI. The fuzzy logic analog of $K_p$ and $K_i$ are reflected in the normalizing factors of the termsets for e and ė. By increasing the range over which the membership functions for the medium, low, and zero magnitude ė have nonzero values, $K_p$ is decreased. Likewise, by increasing the range over which the membership functions for the medium low and zero magnitude e have nonzero values, $K_i$ is decreased.

Small variations in error or the error derivative have less effect on the fuzzy logic PI. In the conventional PI, perturbations in e and ė in the direction of or against the gradient of the control surface would cause du to change greatly. Examining the control surface of the fuzzy PI in FIG. 6a reveals that it is mostly parallel to the e-ė plane. Only if the perturbation forced e and ė into a transitional region where two or more rules would fire would the perturbations have any effect on the controller output.

Figure 5:
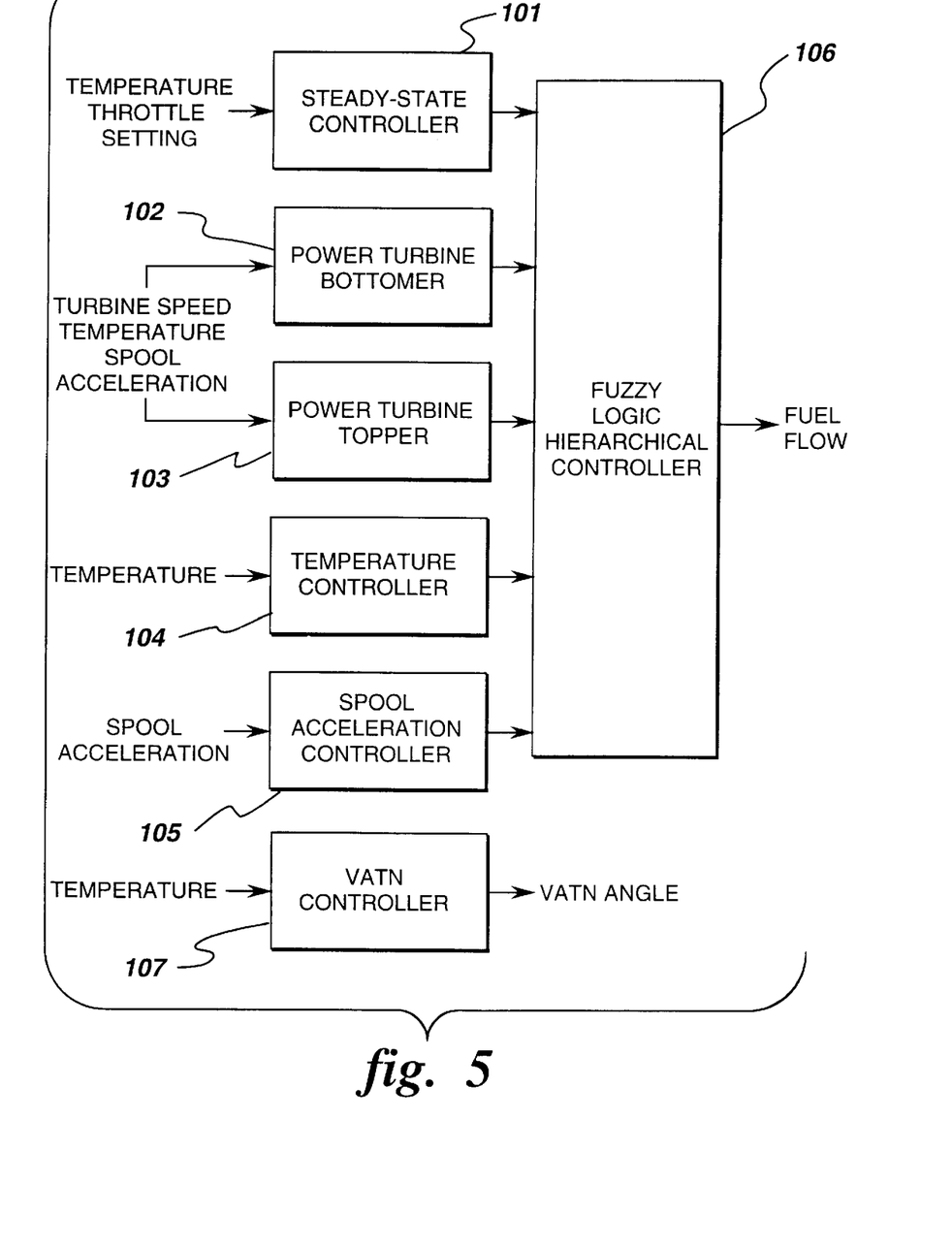
FIG. 5 is a schematic diagram of the fuzzy logic hierarchical control system of the present invention including a VATN controller.
Figure 7A:
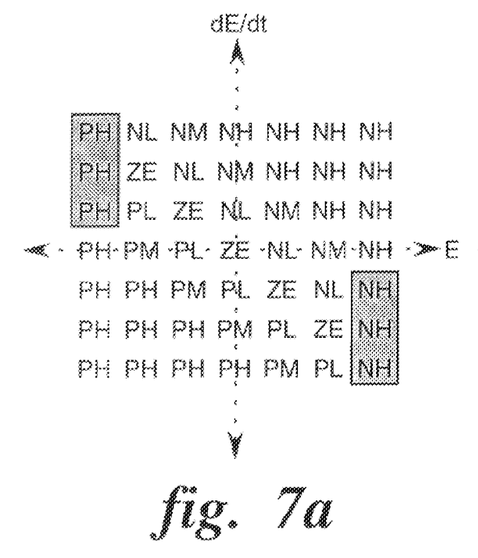
FIG. 7a is the control matrix for the steady-state controller.
Figure 7B:
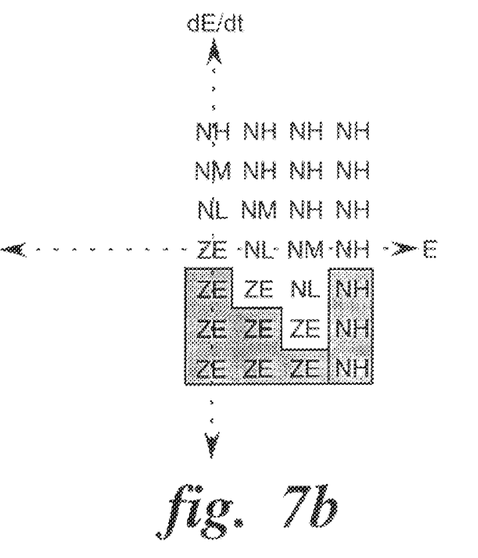
FIG. 7b is the control matrix for the temperature controller and spool acceleration controller.
Figure 7C:
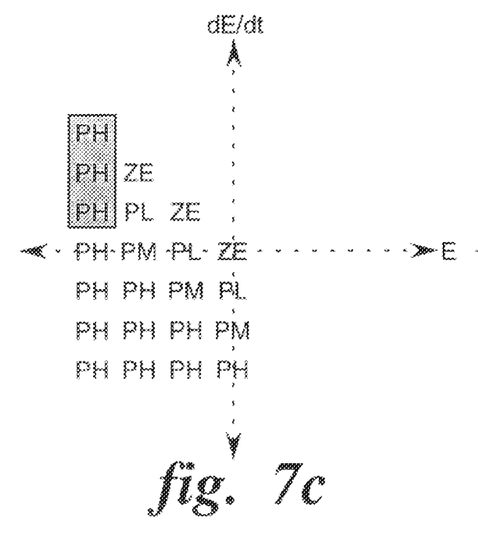
Figure 7D:
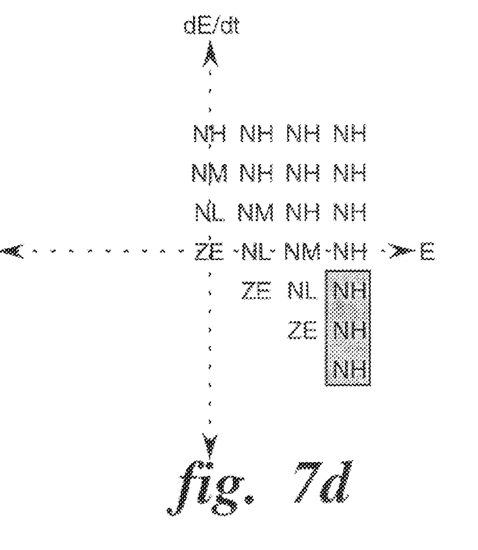

In FIG. 5, VATN controller 107 handles VATN angle control and is not coupled with the fuzzy controller 106. The steady-state controller 101 and the VATN controller 107 are used for nominal control. The steady-state controller employs throttle setting as a reference. Its control matrix in FIG. 7a is similar to that of the one shown in FIG. 6c except where the magnitude of the error between throttle setting and power turbine speed is too high. For positive errors, when the actual value is above its reference, a large negative action for all values of the error derivative is necessary to improve response; for negative errors, a large positive action is required.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

TABLE 1

| Temp. | Turbine Speed | Core Accel. | Steady-State Controller | Power Turbine Topper | Power Turbine Bottomer | Temp Controller | Core Accel Cont. |
|---|---|---|---|---|---|---|---|
| normal | normal | pos high | 0.40 | | | | 0.60 |
| | | pos low | 1.00 | | | | |
| | | zero | 1.00 | | | | |
| | | neg | 1.00 | | | | |
| | low | pos high | 0.26 | | 0.14 | | 0.60 |
| | | pos low | 0.40 | | 0.60 | | |
| | | zero | 0.30 | | 0.70 | | |
| | | neg | 0.20 | | 0.80 | | |
| | high | pos high | 0.13 | 0.27 | | | 0.60 |
| | | pos low | 0.33 | 0.67 | | | |

TABLE 1-continued

| Temp. | Turbine Speed | Core Accel. | Steady-State Controller | Power Turbine Topper | Power Turbine Bottomer | Temp Controller | Core Accel Cont. |
|---|---|---|---|---|---|---|---|
| | | zero | 0.33 | 0.67 | | | |
| | | neg | min | min | | | |
| high | normal | pos high | 0.06 | | | 0.34 | 0.60 |
| | | pos low | 0.27 | | | 0.73 | |
| | | zero | 0.65 | | | 0.35 | |
| | | neg | min | | | min | |
| | low | pos high | 0.06 | | 0.11 | 0.40 | 0.43 |
| | | pos low | 0.10 | | 0.20 | 0.70 | |
| | | zero | 0.16 | | 0.67 | 0.17 | |
| | | neg | 0.16 | | 0.67 | 0.17 | |
| | high | pos high | 0.09 | 0.19 | | 0.12 | 0.60 |
| | | pos low | 0.23 | 0.47 | | 0.30 | |
| | | zero | 0.26 | 0.48 | | 0.26 | |
| | | neg | min | min | | min | |

What is claimed is:

1. A control system for controlling a turboshaft or an aircraft engine comprising:

a plurality of fuzzy proportional-integral low-level controllers adapted to receive engine signals, each of said fuzzy proportional-integral low-level controllers operable to output a control variable value that is based upon said received engine signals; and a fuzzy logic hierarchical controller connected to said plurality of fuzzy proportional-integral low-level controllers to receive each of said control variable values, said fuzzy logic hierarchical controller being adapted to generate a single output value for each control variable which is used for controlling said aircraft engine, the single output value is an aggregation of said control variable values received from said plurality of fuzzy proportional-integral low-level controllers, wherein the aggregation is a weighted sum of said control values.

2. A control system in accordance with claim 1 wherein said fuzzy hierarchical controller includes a memory adapted to store a fuzzy rule base comprising a plurality of fuzzy rules being fired to assign a predetermined weight to said received control variable values in accordance with operating modes for said engine.

3. A control system in accordance with claim 2 wherein said operating modes are selected in accordance with fuzzy values of said engine signals received by said plurality of low-level controllers.

4. A control system in accordance with claim 3 wherein said engine signals are selected from a group consisting of a recuperator inlet temperature, a spool acceleration and a power turbine speed.

5. A control system in accordance with claim 3 wherein said hierarchical controller is adapted to use a weighted sum of said plurality of control variables to generate said single output value.

6. A control system for controlling a turboshaft or an aircraft engine comprising:

a plurality of fuzzy proportional-integral low-level controllers adapted to receive engine signals, each of said fuzzy proportional-integral low-level controllers operable to output a control variable value that is based upon said received engine signals;

a fuzzy logic hierarchical controller connected to said plurality of fuzzy proportional-integral low-level controllers to receive each of said control variable values, said fuzzy logic hierarchical controller being adapted to generate a single output value for each control variable which is used for controlling said aircraft engine, the single output value is an aggregation of said control variable values received from said plurality of fuzzy proportional-integral low-level controllers, wherein the aggregation is a weighted sum of said control values; and a memory in said fuzzy logic hierarchical controller adapted to store a fuzzy rule base comprising a plurality of fuzzy rules being fired to assign a predetermined weight to said received control variable values in accordance with operating modes for said aircraft engine.

7. A control system in accordance with claim 6 wherein said operating modes are selected in accordance with respective fuzzy values of said engine signals received by said plurality of low-level controllers.

8. A control system in accordance with claim 7 wherein said engine signals are selected from a group consisting of a recuperator inlet temperature, a spool acceleration and a power turbine speed.

9. A control system for controlling a turboshaft or an aircraft engine comprising:

a plurality of fuzzy proportional-integral low-level controllers each receiving engine signals, each of the plurality of fuzzy proportional-integral low-level controllers outputting a control variable value that is based upon the received engine signals; and a fuzzy logic hierarchical controller connected to the plurality of fuzzy proportional-integral low-level controllers for receiving each of the control variable values, the fuzzy logic hierarchical controller including a memory for storing a fuzzy rule base having a plurality of fuzzy rules that assigns a predetermined weight to each of the received control variable values in accordance with operating modes of the aircraft engine and a fuzzy inference engine for determining applicability of each rule in the fuzzy rule base for the received control variable values, creating a weighted distribution of output values from the applicable rules, and aggregating each distribution into a single control action value.

\* \* \* \* \*